UNITED STATES PATENT OFFICE.

BENJAMIN F. PENNY, OF ROCHESTER, ASSIGNOR TO THADDEUS B. CURTIS, OF NEW YORK, N. Y.

IMPROVEMENT IN ARTIFICIAL FUEL.

Specification forming part of Letters Patent No. 111,565, dated February 7, 1871; reissue No. 4,967, dated July 9, 1872.

*To all whom it may concern:*

Be it known that I, BENJAMIN F. PENNY, of Rochester, in the county of Monroe and State of New York, have invented an Improvement in Artificial Fuel; and the following is declared to be a correct description of the same.

Difficulty has been experienced in burning coal-dust, and many efforts have been made to mix clay and bituminous substances to form blocks or lumps to be introduced into stoves or furnaces and burnt; but the costliness of preparation, and the difficulties connected with burning the same, have rendered such efforts unsuccessful or valueless.

This invention is for the purpose of burning coal-dust with but little smoke, and without the particles of fuel falling away unconsumed. I have discovered that a mixture of anthracite and bituminous coal-dust will burn in such a manner that there will be but little smoke, and the particles of fuel will not fall through unconsumed.

The dust of anthracite and bituminous coal are mixed in the proportion of about twenty-five per cent. of bituminous and seventy-five per cent of anthracite coal, more or less. The bituminous coal, under the operation of heat, cokes and causes the particles of anthracite coal to adhere in a mass until they are consumed, because the anthracite coal intensifies the fire and burns up the carbonaceous gases from the bituminous coal, and the mass in the furnace cokes and consumes away until the earthy particles fall away from the burning fuel.

It is usually preferable to mix the coal with sufficient water to cause the particles to adhere together, so that they may be more easily shoveled into the furnace, and care is to be taken not to charge the furnace too much at one time, so as to deaden the fire, and the watery vapors are beneficial rather than detrimental.

I remark that this fuel is not adapted to use in first lighting the fire; it is to be burnt after there is a body of incandescent fuel upon which the shovelfulls of such artificial fuel are thrown. This fuel is most available where the blast from a blower is employed.

The article herein referred to as coal-dust is to be understood as being particles of coal of a smaller size than the merchantable article known as nut-coal.

I claim as my invention—

The mode herein specified of burning anthracite coal-dust by the admixture of sufficient bituminous coal-dust, to cause the particles to coke and adhere while burning, substantially as set forth.

Signed by me this 12th day of June, A. D. 1872.

BENJAMIN F. PENNY.

Witnesses:

SETH H. TERRY,

LUTHER C. BENEDICT.